Patented Sept. 15, 1936

2,054,483

UNITED STATES PATENT OFFICE 2,054,483

RUBBER COMPOSITION

George D. Martin, Nitro, W. Va., assignor, by mesne assignments, to Monsanto Chemical Company, Wilmington, Del., a corporation of Delaware No Drawing. Application June 4, 1934, Serial No. 728,854

20 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resisters or antioxidants. One object of this invention is to provide a new and superior class of antioxidants for rubber. A further object of this invention is to provide a new and superior class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test. In all the oxygen bomb tests hereinafter set forth, the aging was carried out at temperatures of 70° C. and an oxygen pressure of 300 pounds per square inch.

The flex cracking resistance of the vulcanized rubber products was determined on a flexing machine as set forth by L. V. Cooper, Analytical Edition of Industrial and Engineering Chemistry, vol. 2, No. 4, 1930, pages 391–394.

According to the present invention, a new class of antioxidants or age-resistors has been found which, upon incorporating into a rubber stock, imparts exceptional age resisting qualities and flex cracking resistance to the vulcanized rubber product. The compounds herein disclosed as imparting such desirable properties to vulcanized rubber comprise a reaction product of a diarylamine, an aliphatic aldehyde and an aromatic hydroxide.

It is thought the principal reactions involved in the preparation of the preferred antioxidants of the present invention may be represented as follows:

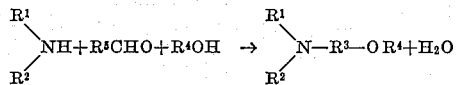

wherein $R^1$, $R^2$ and $R^4$ are aryl radicals, $R^3$ is an alkylidene radical and $R^5$ is hydrogen or an alkyl radical (see McLeod and Robinson, Journal of the Chemical Society, volume 119, part 2, (1921) page 1471).

For example, the following reaction products are typical members of the preferred class of materials outlined above: Reaction product of substantially equi-molecular proportions of diphenylamine, formaldehyde and cyclohexanol; reaction product of substantially equi-molecular proportions of diphenylamine, acetaldehyde and cyclohexanol; reaction product of substantially equi-molecular proportions of diphenylamine, butyraldehyde and phenol; reaction product of substantially equi-molecular proportions of diphenylamine, formaldehyde and phenol; reaction product of substantially equi-molecular proportions of diphenylamine, formaldehyde and beta naphthol; reaction product of substantially equi-molecular proportions of beta beta dinaphthylamine, formaldehyde and phenol; reaction product of substantially equi-molecular proportions of ditolylamine, heptaldehyde and cresol and their chemical equivalents.

Any one or a mixture of the above enumerated substances or of these substances with other antioxidants may be incorporated into rubber with good effect on the properties thereof.

The following are to be understood as illustrative of the invention and not limitative of the scope thereof.

*Example I*

50 parts by weight of diphenylamine (substantially 0.3 a molecular proportion), 23 parts by weight of 40% formaldehyde solution (substantially 0.3 a molecular proportion), 33 parts by weight of cyclohexanol (substantially a 10% excess over 0.3 a molecular proportion) and 25 parts by weight of sodium carbonate were placed in a suitable reactor and heated with agitation at a convenient temperature, for example 60 to 70° C., until the reaction was completed. The undissolved sodium carbonate was then removed preferably by filtration and the excess unreacted cyclohexanol removed by distillation. The residual liquid comprising the crude reaction product may be employed as an antioxidant without further purification. If convenient or desirable, the crude reaction product may be purified by distillation under reduced pressure, whereupon a liquid product distilling at substantially 204–206° C. at 5 mm. pressure is obtained. A portion of the purified product described above was incorporated in the usual manner in a typical tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The reaction product of diphenylamine, formaldehyde and cyclohexanol | 1.0 |

The rubber stock so compounded was then vulcanized by heating in a press maintained at 30 pounds of steam pressure per square inch, and portions of the cured rubber product aged by heating in the Bierer-Davis oxygen bomb for 96 hours at 70° C. and under 300 pounds oxygen pressure per square inch. A comparison between the physical characteristics of the aged and unaged rubber products is given in Table I.

*Table I*

| Cure | | | Modulus of elasticity in lbs./in.$^2$ at elongation of 300% | Tensile at break in lbs./in.$^2$ | Ult.elong. percent |
|---|---|---|---|---|---|
| Mins. | Lbs. steam pressure | Hrs. aged | | | |
| 75 | 30 | 0 | 2400 | 4665 | 535 |
| 75 | 30 | 96 | 1990 | 2780 | 450 |
| 90 | 30 | 0 | 2330 | 4470 | 500 |
| 90 | 30 | 96 | 2010 | 2615 | 410 |
| 105 | 30 | 0 | 2440 | 4300 | 480 |
| 105 | 30 | 96 | 2105 | 2550 | 385 |

Portions of the unaged stock were flexed in the manner hereinbefore set forth before aging and after 3 days' aging in the well known Geer oven at 70° C., and found to be markedly resistant to the deteriorating influence of flex cracking and far superior to the same stock containing no antioxidant. It is thus shown that the preferred class of materials, for example the reaction product of diphenylamine, formaldehyde and cyclohexanol comprise an important class of vulcanization antioxidants or age-resisters.

*Example II*

Substantially equi-molecular proportions of diphenylamine, formaldehyde and phenol were reacted in a manner analogous to that employed in Example I. The product so obtained, comprising a brown oil, was incorporated in a rubber stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The reaction product of diphenylamine, formaldehyde and phenol | 1.0 |

The stock so compounded was vulcanized and the cured rubber product aged in the oxygen bomb. A comparison between the physical properties of the aged and unaged cured rubber product is given in Table II.

*Table II*

| Cure | | | Modulus of elasticity in lbs./in.$^2$ at elongation of 300% | Tensile at break in lbs./in.$^2$ | Ult. elong. percent |
|---|---|---|---|---|---|
| Mins. | Lbs. steam pressure | Hrs. aged | | | |
| 75 | 30 | 0 | 2330 | 4580 | 530 |
| 75 | 30 | 96 | 2020 | 2750 | 440 |
| 90 | 30 | 0 | 2245 | 4510 | 520 |
| 90 | 30 | 96 | 2025 | 2665 | 410 |
| 105 | 30 | 0 | 2480 | 4550 | 500 |
| 105 | 30 | 96 | 2050 | 2455 | 375 |

Flexing tests carried out as described on stocks wherein the reaction product of diphenylamine, formaldehyde and phenol was incorporated showed them also to possess desirable anti-flex cracking properties.

As a third specific embodiment of the present invention, a reaction product of substantially equi-molecular proportions of diphenylamine, formaldehyde and beta naphthol was prepared in a manner analogous to that employed in Example I. The product prepared as described, comprising a solid, was milled in the well known manner into a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The reaction product of diphenylamine, formaldehyde and beta naphthol | 1.0 |

The stock so compounded was vulcanized and the vulcanized rubber product aged in the Bierer-Davis oxygen bomb. A comparison between the physical properties of the aged and unaged vulcanized rubber product follows in Table III.

*Table III*

| Cure | | | Modulus of elasticity in lbs./in.$^2$ at elongation of 300% | Tensile at break in lbs./in.$^2$ | Ult. elong. percent |
|---|---|---|---|---|---|
| Mins. | Lbs. steam pressure | Hrs. aged | | | |
| 75 | 30 | 0 | 2370 | 4600 | 525 |
| 75 | 30 | 96 | 1795 | 2155 | 390 |
| 90 | 30 | 0 | 2320 | 4255 | 485 |
| 90 | 30 | 96 | 1745 | 1990 | 355 |
| 105 | 30 | 0 | 2435 | 4550 | 500 |
| 105 | 30 | 96 | 1805 | 1840 | 305 |

Stocks wherein the reaction product of diphenylamine, formaldehyde and beta naphthol was incorporated also showed marked resistance to deterioration due to flex cracking.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product obtainable by reacting in the presence of an alkaline inorganic catalyst substantially equi-molecular proportions of a diarylamine, an aliphatic aldehyde and an aromatic mono hydroxide consisting in carbon, hydrogen and oxygen atoms only.

2. The method of preserving rubber which comprises treating rubber with a reaction product obtainable by reacting in the presence of an alkaline inorganic catalyst substantially equi-molecular proportions of diphenylamine, an aliphatic aldehyde and a monohydric phenol consisting in carbon, hydrogen and oxygen atoms only.

3. The method of preserving rubber which comprises treating rubber with a reaction product obtainable by reacting in the presence of an alkaline inorganic catalyst substantially equi-molecular proportions of diphenylamine, formaldehyde and a mono hydric phenol consisting in carbon, hydrogen and oxygen atoms only.

4. The method of preserving rubber which comprises treating rubber with a reaction product obtainable by reacting in the presence of an alkaline inorganic catalyst substantially equi-molecular proportions of diphenylamine, formaldehyde and cyclohexanol.

5. The method of preserving rubber which comprises treating rubber with a reaction product obtainable by reacting in the presence of an alkaline inorganic catalyst substantially equi-molecular proportions of diphenylamine, formaldehyde and phenol.

6. The method of preserving rubber which comprises treating rubber with a reaction product obtainable by reacting in the presence of an alkaline inorganic catalyst substantially equi-molecular proportions of diphenylamine, formaldehyde and beta naphthol.

7. A composition comprising rubber and a reaction product obtainable by reacting in the presence of an alkaline inorganic catalyst substantially equi-molecular proportions of a diarylamine, an aliphatic aldehyde and a mono hydric phenol consisting in carbon, hydrogen and oxygen atoms only.

8. A composition comprising rubber and a reaction product obtainable by reacting in the presence of an alkaline inorganic catalyst substantially equi-molecular proportions of diphenylamine, an aliphatic aldehyde and a mono hydric phenol consisting in carbon, hydrogen and oxygen atoms only.

9. A composition comprising rubber and a reaction product obtainable by reacting in the presence of an alkaline inorganic catalyst substantially equi-molecular proportions of diphenylamine, formaldehyde and cyclohexanol.

10. A composition comprising rubber and a reaction product obtainable by reacting in the presence of an alkaline inorganic catalyst substantially equi-molecular proportions of diphenylamine, formaldehyde and phenol.

11. A composition comprising rubber and a reaction product obtainable by reacting in the presence of an alkaline inorganic catalyst substantially equi-molecular proportions of diphenylamine, formaldehyde and beta naphthol.

12. A vulcanized rubber product possessing age resisting properties comprising the vulcanization product of a rubber stock containing prior to the vulcanization thereof a product obtainable by reacting in the presence of an alkaline inorganic catalyst substantially equi-molecular proportions of a diarylamine, an aliphatic aldehyde and a mono hydric phenol consisting in carbon, hydrogen and oxygen atoms only.

13. A vulcanized rubber product possessing age resisting properties comprising the vulcanization product of a rubber stock containing prior to the vulcanization thereof a product obtainable by reacting in the presence of an alkaline inorganic catalyst substantially equi-molecular proportions of diphenylamine, an aliphatic aldehyde and a mono hydric phenol consisting in carbon, hydrogen and oxygen atoms only.

14. A vulcanized rubber product possessing age resisting properties comprising the vulcanization product of a rubber stock containing prior to the vulcanization thereof a product obtainable by reacting in the presence of an alkaline inorganic catalyst substantially equi-molecular proportions of diphenylamine, formaldehyde and cyclohexanol.

15. A vulcanized rubber product possessing age resisting properties comprising the vulcanization product of a rubber stock containing prior to the vulcanization thereof a product obtainable by reacting in the presence of an alkaline inorganic catalyst substantially equi-molecular proportions of diphenylamine, formaldehyde and phenol.

16. A vulcanized rubber product possessing age resisting properties comprising the vulcanization product of a rubber stock containing prior to the vulcanization thereof a product obtainable by reacting in the presence of an alkaline inorganic catalyst substantially equi-molecular proportions of diphenylamine, formaldehyde and beta naphthol.

17. The method of preserving rubber which comprises treating rubber with a product possessing the formula

where $R^1$ and $R^2$ are aryl radicals, $R^3$ is an alkylidene radical and $R^4$ is an aromatic hydrocarbon radical.

18. The method of preserving rubber which comprises treating rubber with a product possessing the formula

where $R^1$, $R^2$ and $R^4$ are aryl hydrocarbon radicals and $R^3$ is a methylene group.

19. A composition comprising rubber and a product possessing the formula

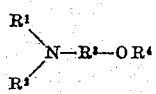

where $R^1$ and $R^2$ are aryl radicals, $R^3$ is an alkylidene radical and $R^4$ is an aromatic hydrocarbon radical.

20. A composition comprising rubber and a product possessing the formula

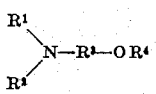

where $R^1$, $R^2$ and $R^4$ are aryl hydrocarbon radicals and $R^3$ is a methylene group.

GEORGE D. MARTIN.